May 30, 1972     L. PADILLA     3,666,327
TRACK SHOE PROTECTOR
Filed July 1, 1970     2 Sheets-Sheet 1

INVENTOR.
LUIS PADILLA
BY
ATTORNEYS

May 30, 1972     L. PADILLA     3,666,327

TRACK SHOE PROTECTOR

Filed July 1, 1970     2 Sheets-Sheet 2

INVENTOR.
LUIS PADILLA
BY
Strauch, Nolan Neale, Nies & Kurz
ATTORNEYS

3,666,327
TRACK SHOE PROTECTOR
Luis Padilla, Apartado 10–91, Managua, Nicaragua
Filed July 1, 1970, Ser. No. 51,623
Int. Cl. B62d 55/56
U.S. Cl. 305—35 R      2 Claims

ABSTRACT OF THE DISCLOSURE

A rubber, plastic or like block of material having integrally formed attachment lugs formed at its opposite ends for securing the block to the respective track shoes of the endless tracks of tractors and earth moving equipment to protect the roadways, display room floors, and the like over which the vehicles are driven. The underface of the block is provided with openings for housing the projecting bolt heads of the track shoes.

BACKGROUND OF THE INVENTION

Track shoes having outwardly projecting metallic grousers have destroyed the pavements, the bridges, roll surfaces, and even the dirt roads, for these reasons many authorities have prohibited driving such vehicles over those roads. Prior devices provided for this purpose have presented problems in attaching and detaching them from the track shoes and as a consequence have not been widely used. Examples of the prior devices are illustrated by the following United States Letters Patents: 1,635,596 White, 2,686,697 Baker, 2,161,486 Rider, 2,869,932 Eichweber, 2,967,737 Moore, 2,969,258 Murray, 3,058,783 Wadsworth et al., 3,117,824 Wadsworth et al., 3,441,321 Darland.

SUMMARY OF THE INVENTION

The present invention overcomes these problems by the provision of a one-piece protector composed of a block-like body of resilient material having integrally formed flexible clamp formations that can be bent by hand to effect assembly on the track shoes.

A primary object of this invention is to protect roads, streets and bridges from destruction produced by the outwardly projecting steel grouser of the endless tracks of tractors when these land vehicles are driven on such roads, and to protect the floors under a tractor in the exhibition rooms;

A further object is to reduce wearing of the grouser itself, when such driving is taking place;

A still further object is to reduce the cost of the protector by providing a one piece object to clamp the track shoe;

A further object is to reduce the time and cost of the attaching and detaching of said protector reducing time and cost of handling these vehicles;

Still another object is to avoid the time delay occasioned by waiting for truck facilities to transport a tractor or the like between jobs.

BRIEF DESCRIPTION OF THE DRAWINGS

Further objects will appear from the following description and appended claims when read in conjunction with the attached drawings wherein:

DESCRIPTION OF PREFERRED EMBODIMENT

Figure 1:
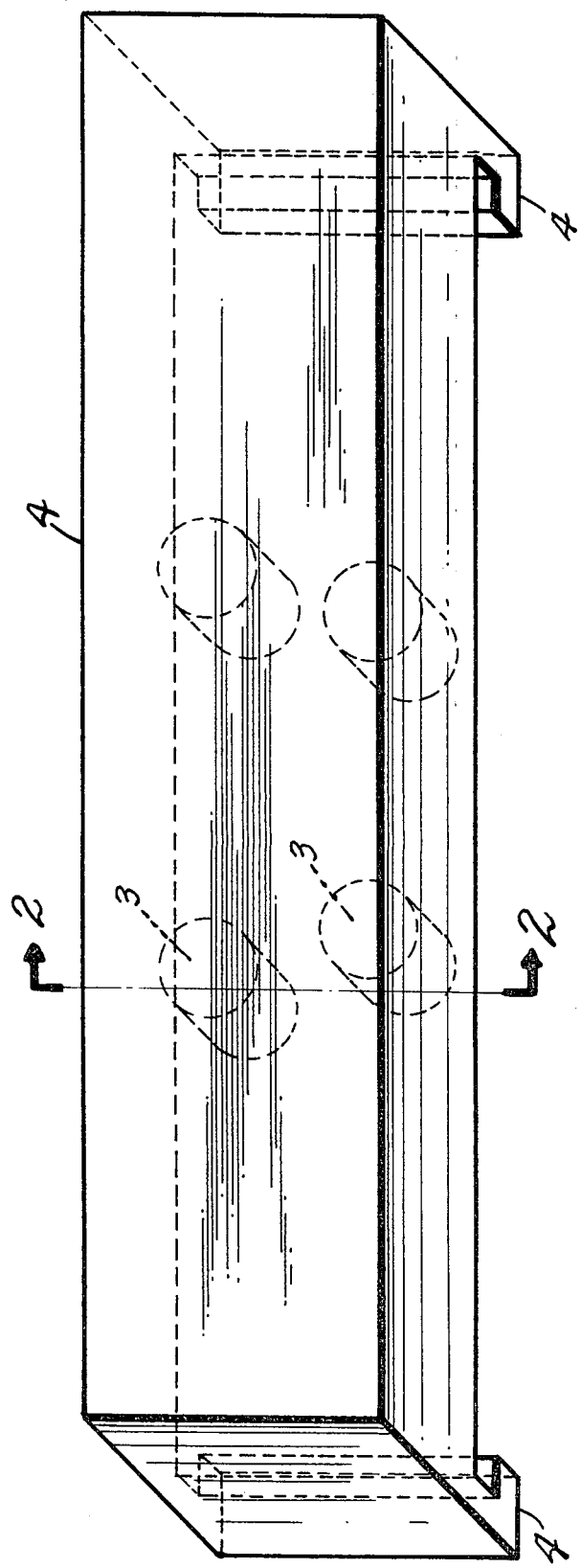
FIG. 1 is a perspective view of a protector constructed in accord with the present invention.
Figure 2:
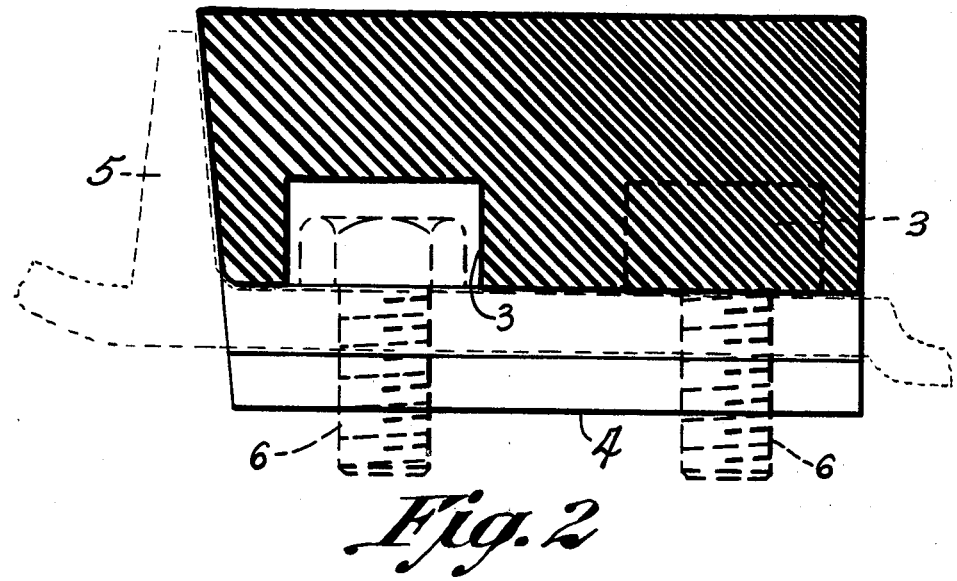
FIG. 2 is a sectional view taken substantially on line 2—2 of FIG. 1 illustrating the housing of the track shoe bolt heads shown in dotted lines along with a track shoe to which the protector is attached.

In the drawings FIG. 1 shows the protector 1 which is manufactured using vulcanized rubber of road tire grade or resilient plastic materials having comparable physical characteristics. FIG. 2 is a cross section through one of the holes 3 and in front of other. These holes 3 house the heads of bolts 6 projecting out of the surface of the planar portion of the track shoe. There are usually four bolts. The holes are round to house the usual hexagon heads of bolts 6 in any position. These holes are the only empty spaces of the protector. Thus the protector will have the greatest possible contact area with the steel track shoe and around and between the recesses provides encircling areas of body material of depth and breadth to receive the hexagon head bolts of the shoe plate as will be apparent from FIG. 2. Numeral 4 shows the bracket-like clamps that define an opening equal to the thickness of the steel plate. Numeral 5 shows the projecting grouser of the track shoe (shown in dotted lines) and the protector wall cooperating therewith is inclined and filleted to assure a full abutting fit against the inclined face of grouser 5 which merges with the planar shoe face through a filleted transition section.

One clamp 4 is hooked first on the interior edge (the one that looks toward the vehicle) of the planar portion of the track shoe, and other clamp is bent by hand and clamped over the exterior edge.

By furnishing the endless track with track shoe protectors, the tractors can be permitted again on the roads. The contact surface of the protector is many times greater than that of the edge of the grouser, since the width of said protector occupies the total free width of the track shoe, and the length is about one inch longer than the track shoe itself. The edge of grouser 5 does not reach the ground surface of the protector, as evident in the drawings, thus protecting the grouser. The protector is to be manufactured as one piece, and will have no other attachments, such as bolts, nuts, steel clamps, etc.

Many times a tractor has to work in different neighboring jobs, connected by streets or roads, and the transportation of the tractor becomes an expensive item. A truck has to be available, the coordination of the operation takes time and the loading and unloading of the tractor takes time and manpower. Having handy protectors, all those problems are solved. For instance a tractor may need 80 protectors which can be installed in less than one hour.

The widening of the track by installing protectors wider than track, does not impair the movement of the endless track, since there is always, in these vehicles, extra free room on both edges of the track.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A protector for the track shoes of endless tracks employed in vehicles such as tractors and earth moving equipment and the like wherein the track shoes are generally flat and provided with a projecting transversely extending grouser, comprising; a body of resilient material having a generally flat undersurface overlying the exposed faces of the track shoes and having at its ends as its sole securing means dependent integrally formed, inturned L-shaped lugs coextensive with and underlying the track shoe ends and a wall at least the same height as and abutting the grouser of the track shoe inclined and filleted at its juncture with the exposed track shoe face to assure a full surface contact throughout with the track shoe.

2. The protector of claim 1, wherein the body of resilient material is provided with openings in its track shoe abutting face to house the projecting bolt heads of the track shoe.

References Cited

UNITED STATES PATENTS

| 1,370,379 | 3/1921 | Staub | 305—51 |
| 2,869,932 | 1/1959 | Eichweber | 305—51 |
| 2,161,486 | 6/1939 | Rider | 305—51 |
| 3,058,783 | 10/1962 | Wadsworth | 305—51 |
| 3,441,321 | 4/1969 | Darland | 305—51 |

FOREIGN PATENTS

| 623,297 | 7/1961 | Italy | 305—35 |
| 468,759 | 10/1950 | Canada | 305—51 |

RICHARD J. JOHNSON, Primary Examiner

U.S. Cl. X.R.

305—51